Dec. 7, 1965   J. E. MAGNUSON   3,221,909

MATERIAL-HANDLING VEHICLE

Filed April 29, 1964   3 Sheets-Sheet 1

JOHN E. MAGNUSON
*INVENTOR.*

BY *Seal, Berry*

ATTORNEYS

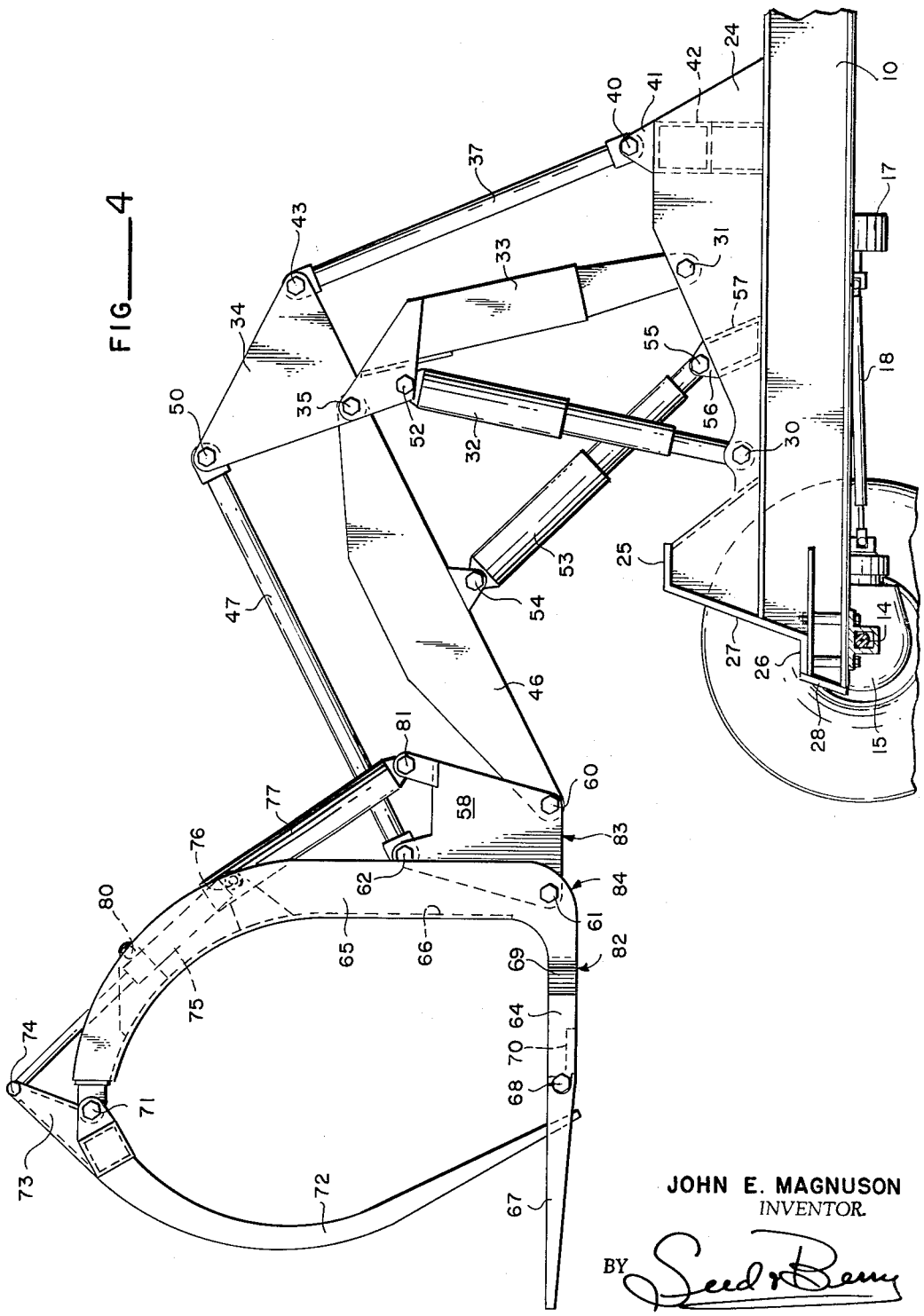

Dec. 7, 1965     J. E. MAGNUSON     3,221,909
MATERIAL-HANDLING VEHICLE
Filed April 29, 1964     3 Sheets-Sheet 3
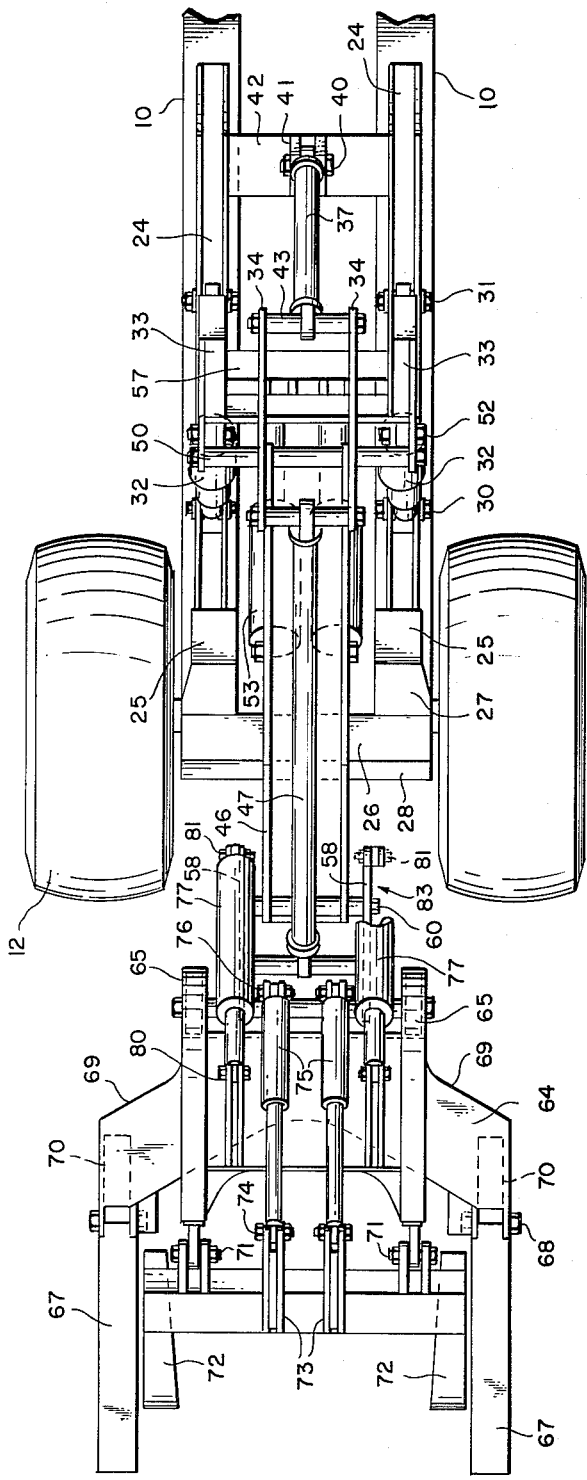
FIG—5
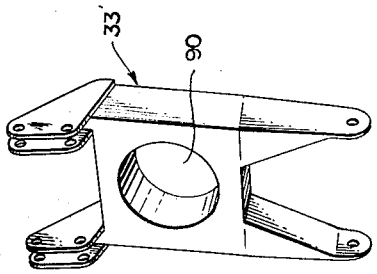
FIG—6
JOHN E. MAGNUSON
INVENTOR.
BY Seed & Berry
ATTORNEYS United States Patent Office 3,221,909
Patented Dec. 7, 1965

3,221,909
MATERIAL-HANDLING VEHICLE
John E. Magnuson, Seattle, Wash., assignor to Pacific Car and Foundry Company, Renton, Wash., a corporation of Washington
Filed Apr. 29, 1964, Ser. No. 363,428
14 Claims. (Cl. 214—147)

This invention relates to a material-handling vehicle, one particularly designed for handling logs. Mobile vehicles for this purpose are commonly termed log stackers and the more favored designs are those in which the material-handling head is supported upon the end of a swingably mounted boom. The heads conventionally provide fork arms to carry the load, and unloading of the head can be accomplished either by tilting the head or by means of sweep-arms which push the load off the forks. Heretofore, the booms have been usually of a stiff-arm character. This dictates, for the head, swing motion in a single arc. In order for the forks to load and unload, this single arc must lie to the front of the vehicle's front wheels. The farther the head can reach, the easier it is for the forks to load and unload, but with a single-arc swinging the advantage achieved from a long reach is countered by the need for increasing the counter-weighting of the vehicle's rear end.

The present invention, as one of its principal objects, aims to provide a mobile log stacker having a jointed as distinguished from a stiff-arm boom. This gives the load-handling head an extended reach but permits such head, when moving the vehicle with a load, to be retracted into a position placing the weight-center of the load close to a perpendicular raised from the vehicle's front axle. A further and ancillary object is to provide a boom having upon its free end a harness from which the material-handling head is supported, and in which the joined sections of the jointed boom each are comprised of parallel-motion links to hold the harness against turning under force of torque passed into the harness from the head.

The invention has the further and important object of providing a mobile log stacker in which the retracted head can rest upon the frame of the vehicle so that a load carried by the head will be supported directly by the frame.

As a further object still the invention purposes to provide a mobile log stacker having its material-handling head so designed that the forks are widely spaced and yet, with said forks occupying a level raised only a moderate degree above the ground, permitting the heel end of the head to move rearwardly between the vehicle tires into a position resting upon the vehicle frame.

A yet further important object is to provide a mobile log stacker in which the forks are hinged to the head for upward swinging motion without, however, unduly loading the hinge pins from the weight of materials carried by the head.

The foregoing and yet additional objects and advantages in view will appear and be understood in the course of the following description and claims, the invention consisting in the novel construction and in the adaptation and combination of parts hereinafter described and claimed.

In the accompanying drawings:

FIG. 4 is an enlarged-scale fragmentary longitudinal vertical sectional view of the log-stacker, with the section line placed immediately to the inside of the vehicle's near wheel.

FIG. 5 is a top plan view thereof; and

FIG. 6 illustrates a modified form of heel for the boom.

Figure 1:
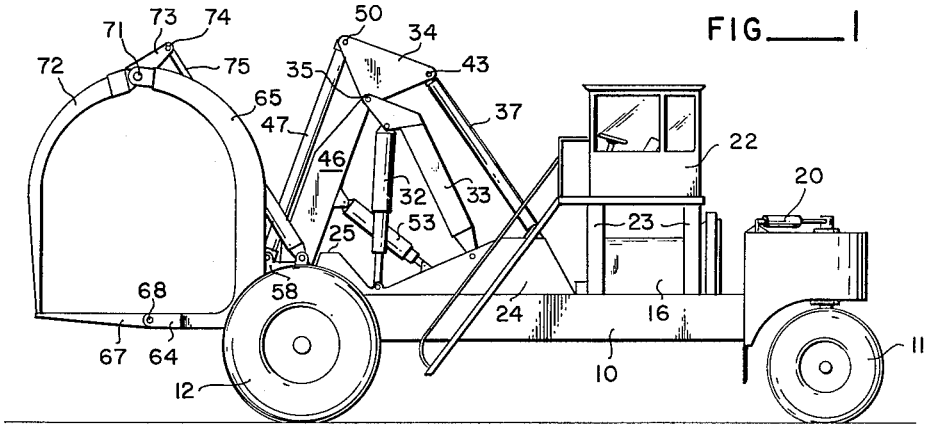
FIGURE 1 is a view in side elevation illustrating a mobile log stacker constructed to embody preferred teachings of the present invention, and with the material-handling head of the stacker shown occupying the lower of two retracted load-carrying positions in both of which the head rests directly lupon the vehicle frame.
Figure 2:
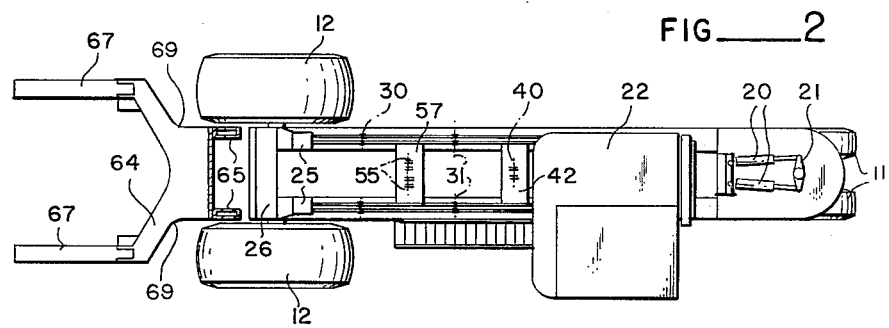
FIG. 2 is a top plan view thereof.
Figure 3:
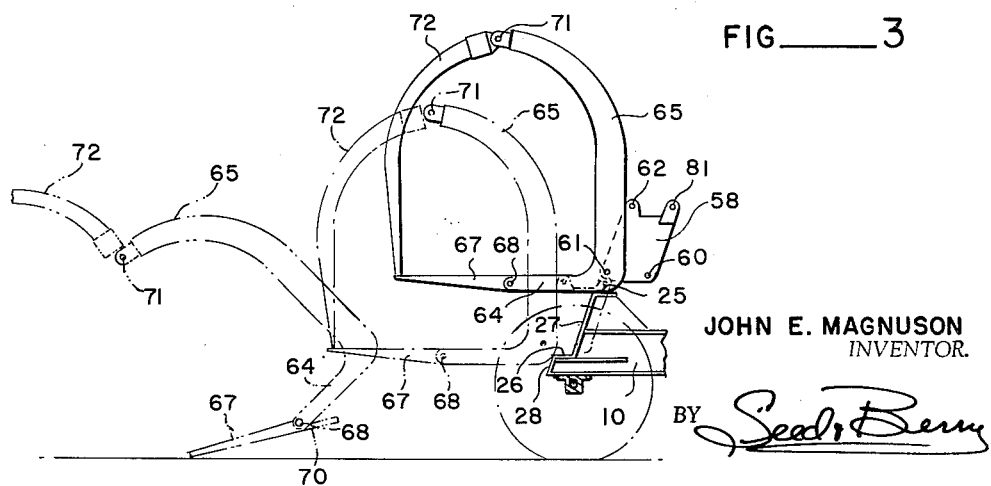
FIG. 3 is a schematic view to illustrate said two "rest" positions and also including a third position to represent the manner in which the head can perform a log-gathering function from a position close-in to the front wheels.

Referring to said drawings, the numeral 10 designates transversely spaced longitudinal principals for the main frame of a rubber-tired vehicle. The vehicle is desirably of the 3-wheel character having a swivel-mounted close-coupled pair of steerable wheels 11 at one end and two driving wheels 12 at the other end. For purposes of the present description, the steerable end will be referred to as the rear end. The driving front wheels lie at opposite sides of the frame and a live axle 14 therefor is driven through a differential 15. The vehicle's power plant 16 lies to the immediate front of the steerable rear wheel and passes its drive forwardly to the upper-level input end of a transmission 17. A torque-shaft 18 leads forwardly to the differential from the lower-level output end of said transmission. The steering of the steerable rear wheels is performed by hydraulic jacks 20 engaging a quadrant 21. A cab 22 for the operator overlies the power plant on stanchions 23. While not here illustrated, a suitable hydraulic system for said jacks 20 and other hydraulic jacks hereinafter to be described has its pumps conventionally driven from the power plant by a power take-off from the engine.

Each of the two longitudinal principals of the main frame is or may be of an I-beam configuration and at the front end is rigidly surmounted by a respective one of two upwardly facing channel members 24, such channel members extending in each instance from the extreme front end of the frame to a point more or less midway between the front and rear wheels. Viewed in side elevation, the front ends of the channel members 24 present trapezoidal humps and these humped ends are boxed in by welded plates. The plate 25 which is applied to the upper base of the trapezoidal figure functions as the upper of two steps of a seat-forming terminal stool and occupies a position spaced somewhat to the rear of a perpendicular raised from the vehicle's front axle 14.

The lower step occupies said perpendicular on a level elevated only a moderate distance above the front axle and is provided by a plate 26 extending the full width of the main frame and seating upon the horizontal sections of respective notches formed in the frame principals 10. The plates 27 applied to the front faces of said trapezoidal humps are prolonged downwardly to the rear edge of the lower step 26. An apron 28 extends between the front edge of the step-plate and the lower flanges of the I-beam principals. This apron serves the function of a stop-bumper for a material-handling head hereinafter described. The stop-bumper, like the lower step-plate, spans the full width of the vehicle frame.

At two longitudinally spaced points, one located immediately to the rear of said trapezoidal hump, and the other spaced a substantial distance rearwardly therefrom, each channel member 24 is traversed by pivot pins, as 30 and 31. The former pin provides a pivot mounting for the lower end of a respective one of two paired double-acting hydraulic jacks 32. The latter provides one of two longitudinally spaced pivot mountings for the heel end of a boom. The boom is a jointed structure providing heel and reach sections which lie in angular relation and by their articulation permit swing motion in a substantial "grass-hopper"action.

Each of these boom sections is composed of a respective set of parallel-motion links. A pair of transversely spaced plates 34 having a matching right triangular shape produce an elbow joint, so to speak, for the articulation. The set of links which forms the heel section for the boom comprises three legs. Two of these legs, denoted by 33, are paired to serve as one link of the set and each connects by a root end thereof with a respective one of the two pivot pins 31. The outer ends pivotally connect with said elbow by a cross-bar 35 located at the apex of the elbow's right triangular figure. A single leg 37 provides the other link for the heel set of parallel-motion links. This single leg occupies a position on the longitudinal median plane of the vehicle and has its root end pivoted at 49 between the arms of a furcate chair 41. The chair is supported by a framing cross-member 42 occupying a position rearwardly spaced from the transverse vertical plane occupied by the pivot pins 31. The outer end of such leg 37 pivots to a bar 43 which extends as a rigid cross-connection from one to the other of said elbow plates 34 at the outer end of one of the two legs of the right triangular figure.

The set of parallel-motion links which form the reach section for the "grass-hopper" boom extends forwardly between such elbow and a harness for thet material-handling head, and comprises two legs 46 and 47. Both legs occupy the longitudinal median plane of the vehicle. Leg 46 comprises a moderately wide channel member and pivots with the cross-bar 35 of the elbow structure. The other leg 47 pivots with the elbow structure by a cross-bar 50.

The paired hydraulic jacks 32 extend from said pivot points 30 to the crotch area of the elbow, each making connection by a pivot pin 52 with the outer end of a related one of the two legs 33. A second set of paired double-acting hydraulic jacks 53, likewise spaced apart transversely of the vehicle, extends between the vehicle frame and the reach section of the boom, connecting by pivot pins 54 with the leg 46 of the latter at a point lying midway between the two ends of the leg, and connecting by pivot pins 55 with the frame at a point lying midway between the pivot points 30 and 31. Furcate chairs 56 for the pivot pins 55 are supported by a cross-member 57.

The harness is comprised of a pair of matching cheek-plates 58, having much the shape of a parallelogram, and connected by cross-bars 60, 61 and 62 at the lower rear, the lower front, and the upper front corners, respectively. For a purpose which will hereinafter appear, the spacing from the outside face of one to the outside face of the other cheek plate is less than the span across the inside faces of the terminal stools. Cross-bar 61 projects by its two ends laterally beyond the cheek plates and forms a trunnion mounting for the material-handling head. Cross-bars 60 and 62 provide the pivotal connections with said parallel-motion links 46 and 47, respectively, of the boom's reach section.

The geometry of the described arrangement of two joined sets of parallel-motion links together with the two extensible arms, and namely the jacks 32 and 53, where the latter extend, one jack between a frame mounting 30 and a point 52 on the boom proximal to the crotch, and the other jack between a frame muonting 55 and a point 54 on the reach section of the boom distal from said crotch, has the important effect of maintaining at all times, regardless of the position in which the harness 58 may be placed, a constant angularity as between the horizontal plane of the vehicle frame and the inclined plane in which the pivot axes 60 and 62 lie. It follows, given a setting of the material-handling head upon the harness by means of hydraulic jacks 77, hereinafter to be described, such that a reference plane of the head lies at a desired angularity relative to a reference plane of the harness, that this setting will then remain unchanged regardless of the movements to which the boom may be subjected.

The material-handling head provides a unitary body part having somewhat of a C-shape when viewed from the side to produce a maw or throat which is open to the front and to both sides. A planar deck 64 provides the bottom wall for the throat. Upright box-section legs 65 connected through a portion of the height by a web 66 provide the back wall for the throat. The span across the legs, outside surfaces considered, is somewhat less than the span between the tires of the vehicle's front wheels 12. The deck has a comparatively long fore-and-aft reach with a wide span at the outer end, and has a cut-back 69 along each side between said wide outer end and a narrow inner end. The cut-backs provide clearance for the vehicle tires when the head occupies the position in which it is shown in FIG. 1.

For the greater portion of its height said back wall is planar and disposed approximately at right angles to the plane of the deck, thence curving upwardly and outwardly into overhanging relation to the deck. The deck is prolonged forwardly by two fork-arms 67, each being free to tilt upwardly about a respective pivot pin 68 but precluded from tilting downwardly beyond a normal position co-planar with the deck by stop-fingers 70 which project inwardly beyond the pivot axis and are brought to bear against the ceiling wall of mating grooves formed in the underside of the deck. The fork-arms desirably taper to a thin tip to facilitate penetration below or between logs which are to be picked up.

A lever of the first order is fulcrumed at 71 to the overhanging free ends of the box-section legs 65, presenting as the work arm thereof a pair of downwardly extending widely spaced hook-shaped claws 72 movable between two extremes of an approximate half-circle arc. These claws serve the usual function of loading arms for drawing logs onto the deck and as keepers for the log loads. The power arm of the lever is comprised of two upstanding cranks 73 each pivoted at 74 to one end of a respective double-acting hydraulic jack 75 having its other end pivoted, as at 76, in the fork of a respective one of two furcate pedestals footing upon a reinforced section of the web 66. A reinforced section of said web also suitably supports a second set of furcate pedestals, more widely spaced than those for the jacks 75. Said jacks 77 are double-acting and extend between these latter pedestals and the upper rear corner of a respective one of the cheek plates of the harness, connecting by a pivot pin 80 with the related pedestal and by a pivot pin 81 with the related cheek plate. The jacks 77 have as their function to dislodge logs from the deck 64 by tilting the load-handling head downwardly about the trunnions 61 as an axis.

It is to be noted that when the deck of the load-handling head occupies the normal position, tilt considered, in which it is shown in FIG. 4, its bottom face 82 is stepped in a moderate degree below the bottom edges 83 of the cheek plates. Both surfaces admit of being selectively seated upon the vehicle frame, the surface 82 upon the step 25 of the terminal stools, or the surfaces 83 upon the plate 26. In the former position the weight center of a load carried by the head can be made to coincide, or approximately coincide, with a perpendicular raised from the front axle 14. In the latter position, which brings the load close to ground level, the exposed shoulder 84 of the head is brought to bear against the stop-face 28 of the frame so as to limit retraction motion of the head. The limit so prescribed is predetermined to preclude the wide end of the deck from coming into contact with the tires.

While not illustrated, arms conventionally mounted so as to sweep the deck in an unloading action can be provided for operations desiring a somewhat higher unloading level than a gravity operation permits. It will be apparent that the "grass-hopper" action of the boom permits an unusually long and high reach. In all positions of the boom the parallel-motion linkage perforce holds the harness against torque forces passed by the jacks 77 through the pins 81 into the harness.

The clamp arms 72, while here illustrated as swinging "inboard" relative to the fork-arms 67, can as well pass "outboard." It should perhaps also be noted, and this is detailed in FIG. 6, that the vehicle, as actually constructed, has the two legs 33 of the boom's root section made an integral part of a fabricated box body. This box body, designated by 33', has an H-shape when viewed from the front and is or may be provided with a window 90 in the cross-arm of the H to give the operator maximum visibility.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. In combination with the frame of an automotive vehicle, a material-handling head, a folding boom structure extending between the vehicle frame and the head comprised of heel and reach sections connected by an intervening elbow joint, both of said sections comprising a set of parallel-motion links, the links of the heel section extending upwardly from the frame to the elbow of the elbow joint with the parallel swing motion being about longitudinally spaced transverse horizontal axes, the links of the reach section extending forwardly from the elbow to the head with the parallel swing motion being about vertically spaced transverse horizontal axes, at least one link of each of said sections having a wide bearing at each of its two pivoted ends, and independent power-operated means one for swinging the heel section of said boom relative to the frame and one for swinging the reach section relative to the heel section, the means for swinging the reach section relative to the heel section comprising a hydraulic jack having one end connected to the frame and the other end connected to one of the links of the reach section at a point thereon distal to the axis about which the latter swings, the power-operated means for swinging the heel section also comprising a hydraulic jack, said latter jack being pivoted at one end to the frame at a point thereon spaced a substantial distance to the front of the boom's frame pivots and at the other end to the boom structure at a point thereon proximal to the elbow.

2. In combination with the frame of an automotive vehicle, a forwardly extending boom structure supported from the frame for compound swing movements in a vertical plane, a material-handling head supported from the forward end of the boom structure, said head providing a load-carrying deck and having an upright member rigid with said deck and rising from the rear end thereof to form a back wall for the head, loading arms pivoted to the head for reciprocal swing motion of the free ends rearwardly toward and forwardly from the deck about a horizontal axis extending transverse to the head and elevated a substantial distance above the deck, independent power means for operating the boom structure in said compound swing movements, for swinging the loading arms, the geometry of the boom structure and the power means which operates the boom structure being such that a transverse reference plane including any given two vertically spaced points on the boom structure located adjacent the latter's forward end maintains a fixed angularity relative to the horizontal plane in which the frame of the vehicle lies regardless of the swing motions to which the boom structure is subjected, the support given to the head from the boom structure comprising a pivot mounting permitting the head to be tilted in said swing plane of the boom structure so that the angularity as between the plane in which the deck lies and said reference plane of the boom structure can be changed, and power means for performing said tilting movements of the head.

3. In combination with the frame of an automotive vehicle, a forwardly extending foldable boom structure supported from the frame for swing movements in a vertical plane, a material-handling head supported from the forward end of the boom structure, said head providing a load-carrying deck and having an upright member rigid with said deck and rising from the rear end thereof to form a back wall for the head, loading arms pivoted to the head for reciprocal swing motion of the free ends rearwardly toward and forwardly from the deck about a horizontal axis extending transverse to the head and elevated a substantial distance above the deck, and independent power means for operating the boom structure in said swing movements and for swinging the loading arms, the vehicle having a pair of transversely spaced ground wheels at the front, said load-carrying deck having a span greater than the spacing between said wheels, the back end of the head having cutbacks at each of the two sides producing for said back end a width less than the span between said wheels to permit retraction of said back end of the head into the space between the wheels upon a folding of the boom.

4. Structure according to claim 3 in which the support for the head being provided by a harness which is carried upon the forward end of the boom structure, the boom structure and the power means for operating the same being of a nature which functions to maintain said harness at all times in the same general relation to the ground.

5. Structure according to claim 3 in which the support for the head being provided by a harness which is carried upon the forward end of the boom structure, the boom structure and the power means for operating the same being of a nature which functions to at all times maintain said harness in the same relation to the ground, the power means comprising double-acting hydraulic jacks.

6. Structure according to claim 3 in which the deck is prolonged forwardly by two fork arms, one at each of the two sides, pivoted to the deck for upward swing motion about a coinciding transverse horizontal axis located in such distal relation to said back wall of the head that a major part of any load carried by the head is directly sustained by the deck.

7. In a load-handling vehicle, a vehicle main frame having a pair of longitudinal principals spaced apart transversely of the vehicle, ground wheels for the front end of the vehicle located at opposite sides of said main frame with their rotary axis lying in close proximity to the front end of the frame, a harness providing cross-connected matching cheek-plates with the over-all span less than the spacing between the frame principals, a folding boom structure extending between the vehicle frame and the harness comprised of heel and reach sections connected by an intervening elbow, both of said sections comprising a set of parallel-motion links, the links of the heel section extending upwardly from the frame to the elbow with the parallel swing motion being about longitudinally spaced transverse horizontal axes, the links of the reach section extending forwardly from the elbow to the harness with the parallel swing motion being about vertically spaced transverse horizontal axes, at least one link of each of said boom sections having a wide bearing at each of its two pivoted ends, respective double-acting hydraulic jacks extending between the frame and the boom for swinging the heel section of the boom relative to the frame and for swinging the reach section relative to the heel section, the frame at its approximate front end having a respective seat-forming stool surmounting each of the two frame principals and also having a seat-forming cross-member extending between the longitudinal principals on a level below the seating level of said stools, said cheek-plates each providing a bottom bearing edge which parallels the seating surface of said cross-member and is adapted to be brought to rest thereon by folding movements of the boom structure, and a material-handling head carried by the harness having a heel portion with flank sections thereof projecting beyond the cheek-plates and adapted to be brought to rest upon the stools by folding movement of the boom structure.

8. Structure according to claim 7 in which the level occupied by the seat-forming cross-member lies a substantial distance below the rim profile of the ground wheels, the material-handling head presenting a load-carrying deck with an over-all span greater than the spacing between said ground wheels and being cut back between said deck and said heel portion at each of the two sides to provide for said heel portion a width less than the spacing between the wheels so that said heel portion has clearance with respect to the wheels when the head is being retracted in course of bringing the cheek-plates to rest upon the cross-member.

9. Structure according to claim 7 in which the harness has a quadrilateral configuration when viewed from the side with the links of the boom's reach section connecting therewith at the bottom rear corner and the top front corner, trunnion pins being provided at the bottom front corner of the harness, the head having its heel portion straddling said bottom front corner and being pivotally sustained by said trunnion pins for tilting motion about a transverse horizontal axis, and double-acting hydraulic jacks, one at each of the two sides of the harness, extending from the upper end of the head to the top rear corner of the harness for controlling said tilting movements of the head.

10. In combination with the frame of an automotive vehicle, a material-handling head, a folding boom structure extending between the vehicle frame and the head comprised of heel and reach sections connected by an intervening elbow joint, both of said sections comprising a set of parallel-motion links, the links of the heel section extending upwardly to the elbow of the elbow joint with the parallel swing motion being about longitudinally spaced transverse horizontal axes, the links of the reach section extending forwardly from the elbow to the head with the parallel swing motion being about vertically spaced transverse horizontal axes, at least one link of each of said sections having a wide bearing at each of its two pivoted ends, and independent power-operated means one for swinging the heel section of said boom relative to the frame and one for swinging the reach section relative to the heel section, said wide-bearing link for the heel section being comprised of a box body having a large window therein so that an otherwise blind area lying to the front of the heel section is visible through said window from a driver's station located to the rear of the heel section.

11. The structure of claim 10 in which the box body has an H-shape when viewed from the front providing widely spaced legs above and below a median portion in which the window occurs.

12. In combination with the frame of an automotive vehicle, a material-handling head, a folding boom structure extending between the vehicle frame and the head comprised of heel and reach sections connected by an intervening elbow joint, both of said sections comprising a set of parallel-motion links, the links of the heel section extending upwardly to the elbow of the elbow joint with the parallel swing motion being about longitudinally spaced transverse horizontal axes, the links of the reach section extending forwardly from the elbow to the head with the parallel swing motion being about vertically spaced transverse horizontal axes, at least one link of each of said sections having a wide bearing at each of its two pivoted ends, and independent power-operated means one for swinging the heel section of said boom relative to the frame and one for swinging the reach section relative to the heel section, the vehicle having a pair of transversely spaced ground wheels at the front, the head providing a forwardly facing load-receiving throat defined at the bottom by a load carrying deck having a span greater than the spacing between said wheels, the back end of the head having cut-backs at each of the two sides producing for said back end a width less than the span between said wheels to permit retraction of said back end of the head into the space between the wheels upon a folding of the boom.

13. Structure according to claim 12 in which the front end of the vehicle frame provides a rest on which the underside of said back end of the head can be seated, means being provided to serve as a limit stop in the head-retracting folding motion of the boom so that the projecting sides of the deck will not be brought into contact with the wheels.

14. In combination with the frame of an automotive vehicle, a material-handling head, a folding boom structure extending between the vehicle frame and the head comprised of heel and reach sections connected by an intervening elbow joint, both of said sections comprising a set of parallel-motion links, the links of the heel section extending upwardly to the elbow of the elbow joint with the parallel swing motion being about longitudinally spaced transverse horizontal axes, the links of the reach section extending forwardly from the elbow to the head with the parallel swing motion being about vertically spaced transverse horizontal axes, at least one link of each of said sections having a wide bearing at each of its two pivoted ends, and independent power-operated means one for swinging the heel section of said boom relative to the frame and one for swinging the reach section relative to the heel section, a rest being provided at the front end of the frame on which the head admits of being seated by the act of folding the boom structure.

References Cited by the Examiner

UNITED STATES PATENTS

| 1,878,995 | 9/1932 | Abbe | 214—731 |
|---|---|---|---|
| 2,418,251 | 4/1947 | Drott | 214—147 X |
| 2,820,555 | 1/1958 | Lessmann | 214—140 |
| 3,079,020 | 2/1963 | Gustine. | |
| 3,080,076 | 3/1963 | Randall | 214—138 |
| 3,125,234 | 3/1964 | Gustine. | |
| 3,140,002 | 7/1964 | Garrett. | |

HUGO O. SCHULZ, *Primary Examiner.*